US006753822B2

(12) United States Patent
Tietjen

(10) Patent No.: US 6,753,822 B2
(45) Date of Patent: Jun. 22, 2004

(54) THERMAL CONTROL SYSTEM

(75) Inventor: Byron W. Tietjen, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/124,194

(22) Filed: Apr. 17, 2002

(65) Prior Publication Data

US 2003/0197654 A1 Oct. 23, 2003

(51) Int. Cl.[7] ........................ H01Q 1/280; H01Q 1/420; F16N 7/36

(52) U.S. Cl. .............................. 343/757; 62/389; 62/98

(58) Field of Search .......................... 343/757, 700 MS, 343/705, 763, 766, 872; 244/118.1; 184/6.12, 11.2; 210/168; 62/389, 98

(56) References Cited

U.S. PATENT DOCUMENTS

| | | | | | |
|---|---|---|---|---|---|
| 5,049,891 | A | * | 9/1991 | Ettinger et al. | 343/705 |
| 5,357,259 | A | * | 10/1994 | Nosal | 342/398 |
| 5,653,476 | A | | 8/1997 | Su et al. | 285/272.1 |
| 5,746,574 | A | | 5/1998 | Czachor et al. | 415/115 |
| 6,446,755 | B1 | * | 9/2002 | Varailhon et al. | 184/6.12 |

* cited by examiner

*Primary Examiner*—James Clinger
(74) *Attorney, Agent, or Firm*—Duane Morris LLP

(57) ABSTRACT

A thermal control system for directing fluids between a reservoir and a rotatable platform. The system comprises a rotatable platform having an inlet port for receiving a cooling fluid; a reservoir adjacent the platform houses the cooling fluid for transport to the rotatable platform; and a non rotary jointed conduit having a first end immersed in the cooling fluid of the reservoir provides a fluid path for the cooling fluid to the rotatable platform.

36 Claims, 7 Drawing Sheets

THERMAL CONTROL SYSTEM

RELATED APPLICATIONS

The present application is related to patent application entitled "ROLLING RADAR ARRAY" filed on Apr. 10, 2002, U.S. Ser. No. 10/119,576 by Byron Tietjen, the inventor herein, the subject matter of which is incorporated by reference herein in its entirety.

FIELD OF THE INVENTION

The present invention relates to thermal control systems, and more particularly to thermal control systems for rotating array platforms.

BACKGROUND OF THE INVENTION

Arrays such as RF beam scanning arrays and the like are often implemented using large rotating array platforms that revolve the array in the azimuth direction. For example, the platform may rotate so as to slew the array by a predetermined azimuth angle, or to scan the entire range of azimuth angles available to the antenna at a constant angular rate. Such large rotating platforms often require a fluid based cooling mechanism to dissipate the heat produced. Traditional approaches to cooling rotating radar array platforms involve the use of rotating joint fluid couplers that draw the fluid from a fixed, stationary heat exchanger to the platform, where it is heated and then pumped back to the heat exchanger through another rotating joint fluid coupler. However, such rotary fluid joints are prone to leakage and represent a common source of failure. Such leakage problems have traditionally been dealt with by simply tolerating the leaks inherent with the conventional rotary fluid joint approach. While more reliable rotary joint fluid couplers may be utilized, such devices still tend to leak, and represent a significant source of system failure.

In similar fashion, the antenna array, which houses electronic components including transmit/receive modules, for example, may utilize a fluid based cooling system for cooling the array. However, a significant problem relates to drawing the cooling fluid up to the array without using rotary joint fluid couplers.

An apparatus and method for providing a reliable thermal control system that is not subject to such component fatigue is highly desired.

SUMMARY OF THE INVENTION

One aspect of the invention is a thermal control system for directing fluids between a reservoir and a rotatable platform. The system comprises a rotatable platform having an inlet port for receiving a cooling fluid; a reservoir for housing the cooling fluid for transport to the rotatable platform; and a non rotary jointed conduit having a first end immersed in the cooling fluid of the reservoir for providing a fluid path for the cooling fluid to the rotatable platform.

Another aspect of the invention is a method for cooling a rotatable platform having an inlet port for receiving a cooling fluid, the method comprising providing a reservoir for housing cooling fluid; and providing the cooling fluid housed in the reservoir via a non rotary jointed conduit into the inlet port of the rotatable platform.

Another aspect of the invention is a thermal control system for exchanging fluids between a rotatable platform and a reservoir, the system comprising a rotatable platform having an inlet port for receiving a cooled fluid and an outlet port for providing a heated fluid; a reservoir comprising a first vessel for receiving the heated fluid from the outlet port of the rotatable platform, and a second vessel for housing cooled fluid for transport to the inlet port of the rotatable platform via a non rotary jointed conduit, the conduit having an end immersed in the cooled fluid in the second vessel; and a heat exchanger coupled to the first and second vessels, wherein the heat exchanger is operative for receiving the heated fluid from the first vessel, and for providing cooled fluid to the second vessel, for transport via the non rotary jointed conduit to the rotatable platform.

Another aspect of the invention is an antenna system comprising an antenna array mounted on a first wheel, the first wheel having a circumferential portion adapted to engage at least one path disposed on a platform for revolving the radar array about the platform; an axle coupled to the first wheel; and a thermal control system for providing cooling fluid to the antenna array. The thermal control system comprises a first vessel for housing the cooling fluid for transport to the antenna array; and a non rotary jointed conduit having a first end immersed in the cooling fluid of the first vessel and a second end coupled to the antenna array for providing a fluid path to the array for the cooling fluid.

Another aspect of the invention is a method for cooling a radar antenna system comprising an antenna array mounted on a first wheel, the first wheel having a circumferential portion adapted to engage at least one path disposed on a platform for revolving the radar array about the platform, and an axle coupled to the first wheel, the method comprising: providing a vessel for housing cooling fluid; and providing the cooling fluid housed in the vessel via a non rotary jointed conduit carried by the axle to the array.

Another aspect of the invention is an antenna system comprising an antenna array mounted on a first wheel, the first wheel having a circumferential portion adapted to engage at least one path disposed on a platform for revolving the radar array about the platform; an axle coupled to the first wheel; and a thermal control system for providing cooling fluid to the antenna array. The thermal control system comprises a first vessel for housing the cooling fluid for transport to the antenna array; and a non rotary jointed conduit having a first end immersed in the cooling fluid of the first vessel and a second end coupled to the antenna array, the conduit carried by the axle for providing a fluid path to the array for circulating the cooling fluid. A return fluid path is carried by the axle for transporting the circulated fluid from the array to the first vessel. In a further aspect, a cooling unit is coupled to the first vessel for cooling the fluid for transport to the array.

BRIEF DESCRIPTION OF THE DRAWINGS

The advantages, nature, and various additional features of the invention will appear more fully upon consideration of the illustrative embodiments now to be described in detail in connection with accompanying drawings where like reference numerals identify like elements throughout drawings.

DETAILED DESCRIPTION

Figure 1A:
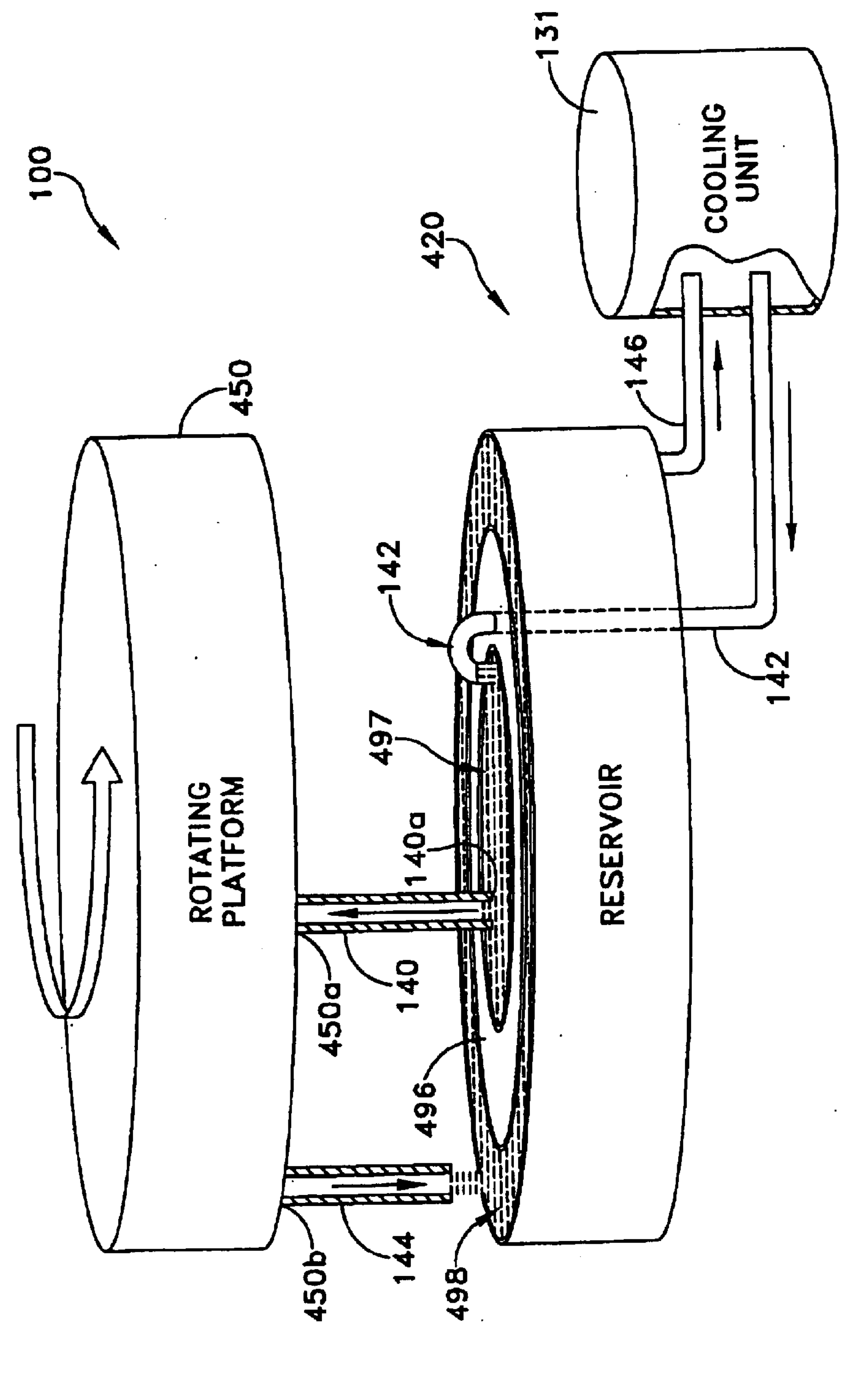
FIG. 1 is a schematic view of a thermal control system for cooling a rotatable platform according to an aspect of the present invention.
FIG. 1B is a schematic view of a thermal control system for cooling a rotatable platform using multiple heat exchangers according to an aspect of the present invention.

FIG. 1A shows a first exemplary embodiment of a thermal control system 100 for directing or transporting fluid between a rotatable platform and a reservoir. As shown in FIG. 1A, a rotating platform 450 may contain electronic or electromechanical components requiring cooling during operation. The rotatable platform may provide a base for a rotating antenna array structure (not shown). The rotatable platform may also provide a means for dispensing cooling fluid to such rotating antenna array structure. Rotatable platform 450 includes an inlet port 450*a* for receiving a cooled fluid and an outlet port 450*b* for dispensing heated fluid that has been heated by circulating the cooled fluid about the platform. In the exemplary embodiment shown in FIG. 1A, a reservoir structure 420 adjacent to platform 450 comprises vessel or reservoir 498 for receiving the heated fluid output from the outlet port 450*b* of the rotatable platform, and vessel or reservoir 497 for housing cooled fluid for transport to the inlet port 450*a* of the rotatable platform. Vessel 497 is coupled to the inlet port of platform 450 via a non rotary jointed conduit 140 having an end 140*a* immersed in the cooled fluid in vessel 497. A cooling unit 131 such as a heat exchanger is coupled to vessel 498 via fluid inlet 146 and to vessel 497 via a fluid return 142. The heat exchanger is operative for receiving the heated fluid via conduit 146 from vessel 498 and for providing cooled fluid via conduit 142 to vessel 497. The cooled fluid is then drawn through conduit 140 whose end 140*a* is immersed in the cooled fluid and transported to the platform through inlet 450*a*.

In the embodiment shown in FIG. 1A, inlet 450*a* is relatively centrally located within the platform so as to cooperate with similarly positioned relatively centrally located vessel 497. The vessel 497 may be configured in a circular, oval, elliptical, annular or other geometrical shape (as well as rectangular, for example, and depending on the location of the inlet and rotation of the platform) and sized and aligned with the platform 450 so that as the platform rotates, non-rotary jointed conduit 140 simply moves through and remains within the fluid, drawing up the coolant within it. After the platform circulates the cooled fluid, which becomes heated, it is exhausted into vessel 498 through outlet 450*b*. The heated fluid is then taken from vessel 498 and transferred via conduit 146 to the heat exchanger, which cools the fluid and pumps it via return 142 to vessel 497. In the exemplary embodiment of FIG. 1A, reservoir 420 is disposed below platform 450. This enables a gravity feed to dispense the heated fluid from the outlet port to vessel 498. Further, as shown in FIG. 1A, vessels 497 and 498 may be configured in concentric fashion separated by a wall portion. Vessel 498 may be configured as an annular ring about vessel 497 and vertically aligned and sized in accordance with the location of the inlet and outlet ports of the rotating platform to enable unfettered movement of conduit 140 within vessel 497, along with unfettered egress of the heated fluid into vessel 498, throughout 360 degree rotation of the platform. Non rotary jointed conduit 140 may comprise a non rotary jointed tube or pipe that moves through the fluid in vessel 497 during platform rotation. The tube or pipe may comprise a flexible material, such as a plastic or rubber-like material, or may be of a more rigid material, such as a metal pipe. The nature and composition of the non rotary jointed tube may depend on specific application requirements, such as the type of fluid circulated, temperature requirements, system requirements, and the like.

As shown, the structure of the thermal control system of FIG. 1A obviates the rotating joint fluid couplers required in conventional systems. Further, a tube or pipe 144 may be coupled to the outlet port 450B of the rotatable platform and aligned with vessel 498 for transport of the heated fluid thereto. Tube or pipe 144 may also comprise a non rotary jointed tube and may be of a material analagous to that described with respect to tube 140. Reservoir 420 may be fixed with respect to rotating platform 450. Heat exchanger 131 is also fixed (i.e. stationary) relative to the reservoir structure.

Figure 1B:
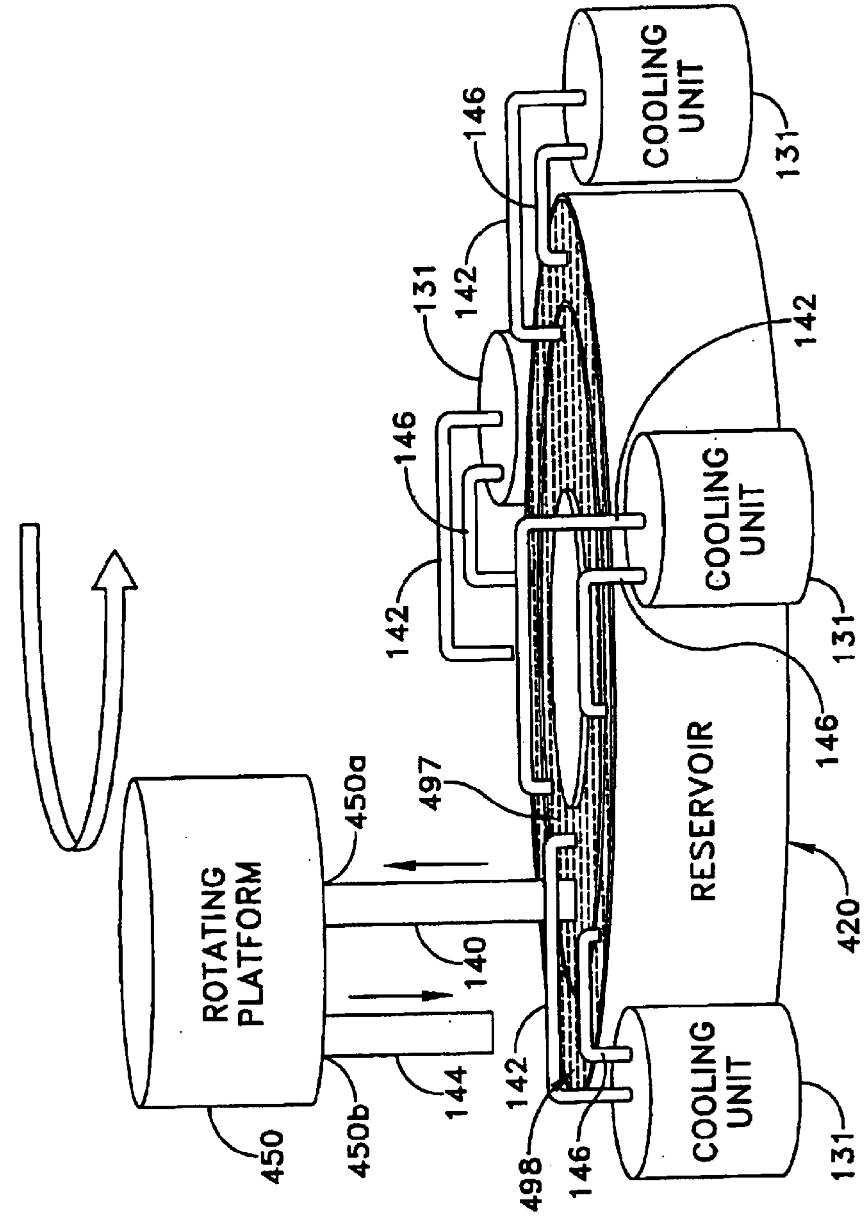

FIG. 1B shows an exemplary embodiment of a thermal control system wherein a plurality of cooling units 131 are coupled to vessel 497. This redundancy enables increased reliability and/or optimizes the cooling by enabling smaller, more efficient heat exchanger units to provide cooling fluid to the system. A controller (not shown) may operate to control the activation/inactivation of such units, either automatically based on preset parameters such as temperature, date/time, operating characteristics, and the like, or in response to user entered data or manual intervention.

Figure 2:
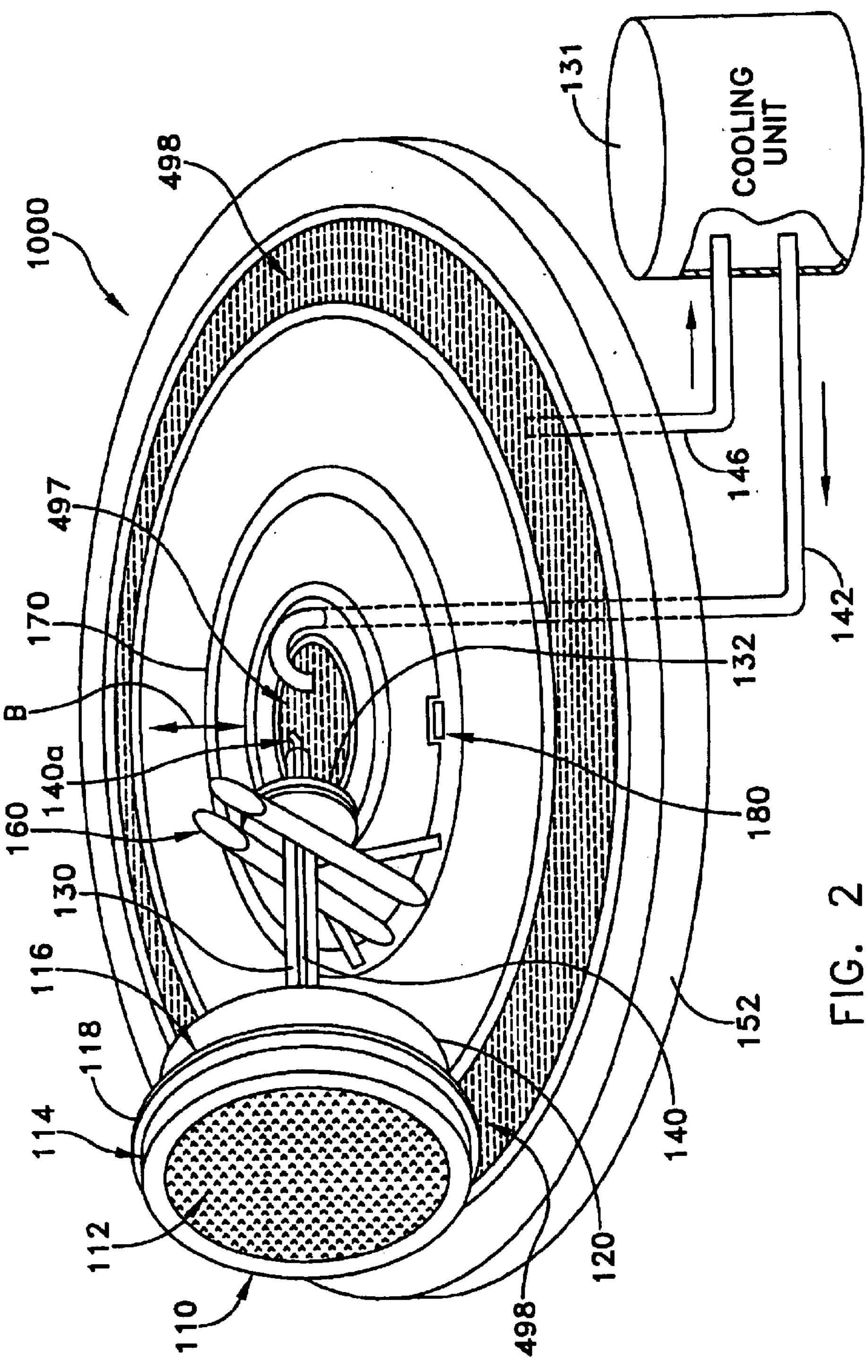
FIG. 2 is a schematic isometric view of a rolling axle array radar system including a thermal control system for cooling the array according to an aspect of the present invention.
Figure 3:
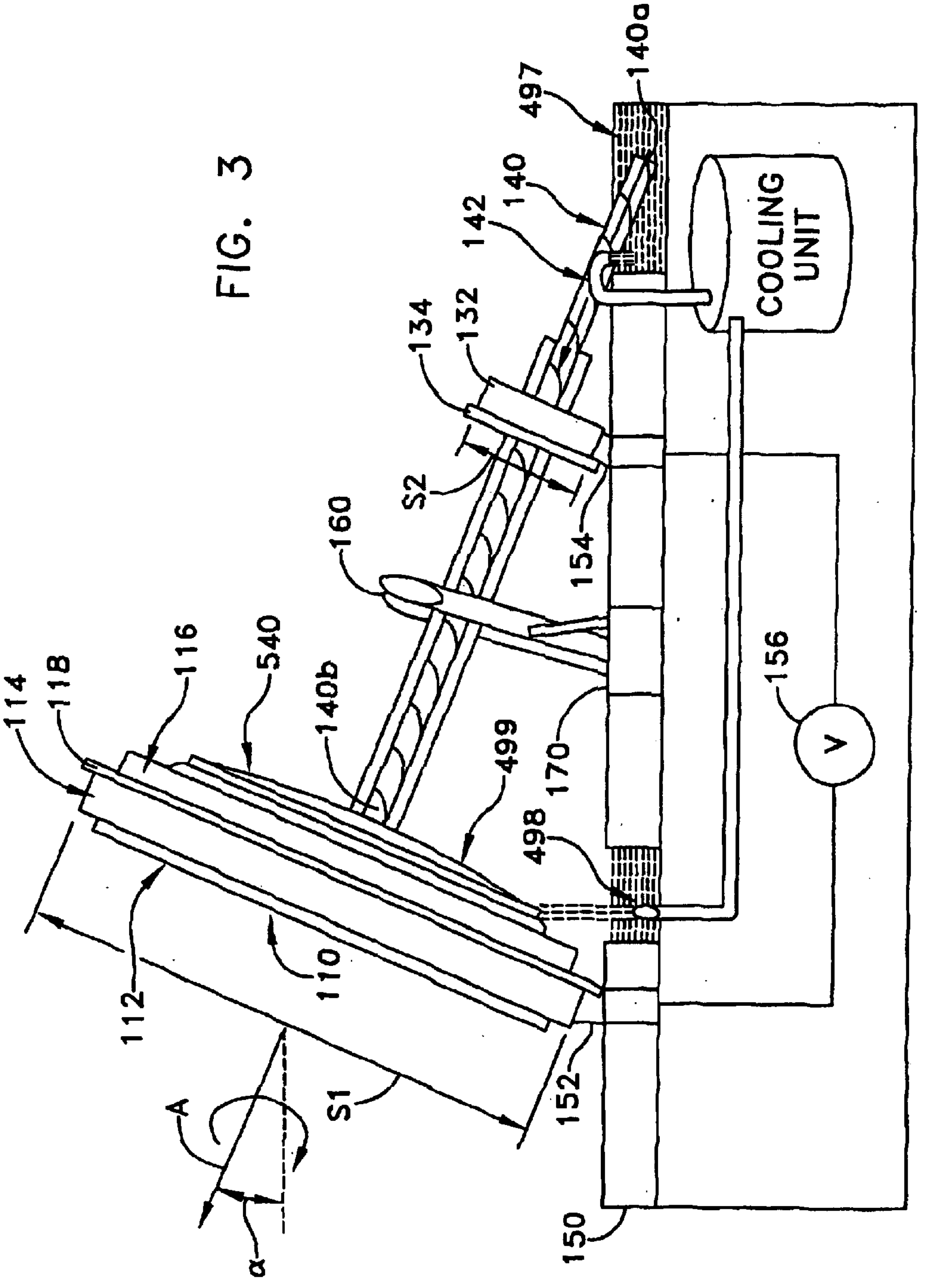
FIG. 3 is a side elevation view of the assembly shown in FIG. 2.
Figure 4:
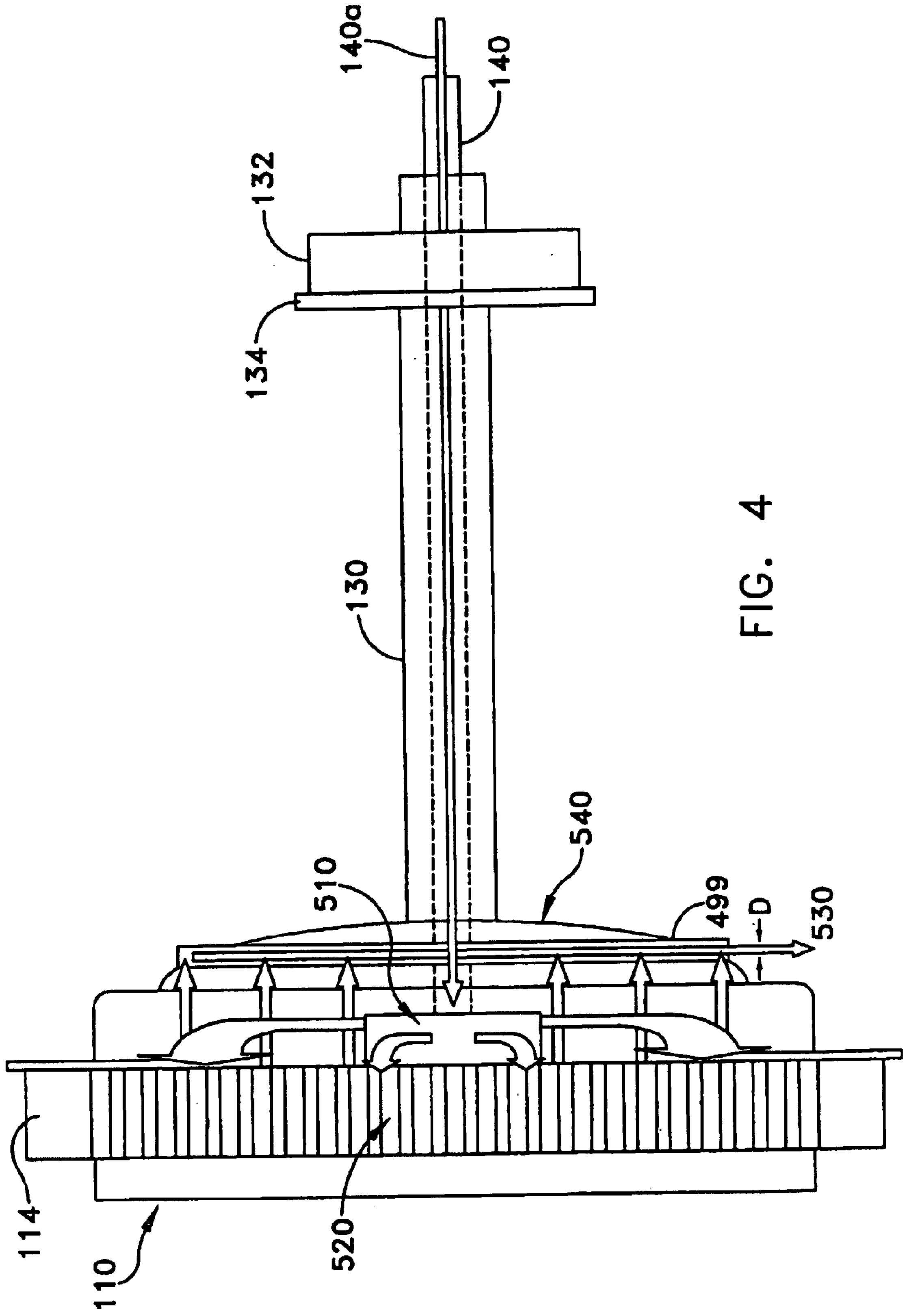
FIG. 4 is a more detailed view of the assembly shown in FIG. 2.

FIGS. 2–4 illustrate an exemplary embodiment of an antenna array system containing a thermal control system according to an aspect of the present invention. The radar system 1000 comprises an array assembly 110 and a platform 150. A radome (not shown) may cover the assembly and platform. The array assembly 110 includes a radar array 112 mounted on a first circular wheel 114 having a first size S1. In addition to the array 112, the first wheel 114 may contain transmitters, receivers, processing and cooling mechanisms. The first wheel 114 has a circumferential portion adapted to engage a path 152 disposed on platform 150 for revolving the radar array 112 about the platform. An axle 130 is coupled to the first wheel 114. The wheel 114 rotates about the axle 130 as the radar array 112 revolves around the platform 150 during operation. In a preferred embodiment of the invention, the radar array 112 rotates with the first wheel 114, as both the radar array 112 and the first wheel 114 revolve around the platform 150. Such a system is shown and described in greater detail in co-pending patent application entitled “ROLLING RADAR ARRAY” filed on Apr. 10, 2002 by Byron Tietjen, the inventor herein, the subject matter of which is incorporated by reference in its entirety herein.

As used below, the terms “rotate” and “roll” refer to the rotation of the first wheel 114 and/or the radar array 112 about a roll Axis “A” (shown in FIG. 3) normal to the radar array, located at the center of the array. The term “revolve” is used below to refer to the “orbiting” motion in the tangential direction of the array assembly 110 about a central axis “B” of the platform 150 (shown in FIG. 1A).

The system 1000 includes a means to support the array 112 in a tilted position, so that the axis “A” is maintained at a constant angle a with respect to the plane of the platform 150. In some embodiments, the radar system 100 also includes a second wheel 132 coupled to the axle 130. Preferably, if present, the second wheel 132 has a second size S2 different from the first size S1 (of the first wheel 114). For example, as shown in FIGS. 1A and 2, the second size S2 is smaller than the first size S1, and the second wheel 132 engages a second path 154 on the platform 150. The first and second paths 152 and 154 are concentric circles, so that the radar array 112 is tilted at a constant angle a between vertical and horizontal as it rotates around the axle 130. The first wheel has a flange 118, and the second wheel has a flange 134. The two flanges 118, 134 help maintain the array assembly 110 on the tracks 152, 154 without any fixture locking the assembly 110 in place. This configuration eliminates the need for very large support structures, such as the bearing mounted platform and bracket structures that supported conventional arrays. Without these large support structures, it is possible to eliminate the large load-bearing bearings that lay beneath the support structures. In other embodiments (not shown), instead of the second wheel 132, the end of the axle 130 opposite the radar array 112 can be supported by a universal joint or other means providing an alternative means for supporting the array in a tilted position.

In the exemplary embodiment of FIG. 2, the first path 152 and second path 154 are conductive tracks. The circumferential portion of the first wheel 114 and the circumferential portion of the second wheel 132 are conductive. The tracks 152, 154 may be connected to power source 156 (see FIG. 3) to provide power and ground to the radar array 110, similar to the technique used to provide power to an electrically powered train by way of conductive tracks. This mechanism allows the elimination of sliprings used to provide power to conventional radar arrays, which revolve around a platform without rotating around the axis normal to the array front face. The signals from the array can be transferred to by an infrared (IR) link, to improve isolation and eliminate crosstalk, so that sliprings are not required to transfer signals, either.

The exemplary system 100 includes a radar array 112 having just one face on it, but capable of covering 360° of azimuth revolution. This configuration can support a very large and heavy array 112 that is very high powered. Sliding surface contacts are not required. The contact between the first wheel 114 and the first path (track) 152, and the contact between the second wheel 132 and the second path (track) 154 are both rolling surface contacts. In a rolling contact, the portions of the wheels 114 and 132 that contact the tracks 132 and 154, respectively, are momentarily at rest, so there is very little wear on the conductive wheels and tracks. This enhances the reliability of the system. In addition, the wheels 114 and tracks 132 can be made of suitably strong material, such as steel, to minimize wear and/or deformation.

FIG. 2 also shows a drive train 160 that causes the first wheel 114 to revolve around the platform 150. A variety of drive mechanisms 160 may be used. All of these mechanisms fall into one of two categories: mechanisms that apply a force to push or pull the array assembly 110 in the tangential direction, and mechanisms that apply a moment to cause the array assembly to rotate about the central axis “A” of the array 112. Both systems are capable of providing the desired rolling action that allows the array assembly 110 to revolve around the platform 150 to provide the desired 360° azimuth coverage. The exemplary embodiment of FIG. 2 shows a drive mechanism 160 that pushes against the axle 130 in the tangential direction, causing the array assembly 110 to roll. Other pushing drive mechanisms (not shown) may be used to push against either the first wheel 114 or second wheel 132 in the tangential direction. Drive 160 includes a rotatable bullring gear 170, including a rotatable ring portion rotatably mounted to the platform 150 by way of a fixed ring portion. Bullring gear 170 has bearings for substantially eliminating friction between the fixed portion 171 and the rotatable ring portion. A motor having a pinion gear drives the rotatable ring portion of bullring gear 170 to rotate.

Various methods are contemplated for operating a radar system comprising the steps of: revolving a wheel 114 housing a radar array 112 around a platform 150 (wherein the radar array has a front face), and rotating the wheel about an axis “A” normal to the front face, so the wheel rotates as the wheel revolves. The method shown in FIG. 2 includes revolving a radar array 112 around a platform 150, the radar array having a front face; and rotating the radar array about an axis “A” normal to the front face as the radar array revolves. Other variations are contemplated.

For example, the wheel 114 may rotate without rotating the radar array 112. The radar array 112 may rotate relative to wheel 114, while wheel 114 rolls around the first track 152 of the platform 150. If the rotation rate of the radar array 112 has the same magnitude and opposite sign from the rotation of the wheel 114, then the radar array 112 does not rotate relative to a stationary observer outside of the system 1000. Rotation of the radar array 112 relative to the wheel 114 may be achieved using a motor that applies a torque directly to the center of the array, or a motor that turns a roller contacting a circumference of the radar array or the inner surface of the circumference of the wheel 114.

Although the example shown in FIG. 2 includes only two wheels 114, 132 and two conductive paths 152, 154 on the platform 150, any desired number of wheels may be added to the axle 130, with a respective electrical contact on the circumferential surface of each wheel, and a corresponding conductive path located on the platform 150. The additional wheels (not shown) would be sized according to their radial distances from the center of the platform 150, so that all of the additional wheels can contact the additional conductive paths (not shown) at the same time that wheels 114 and 132 contact paths 152 and 154. The additional conductive paths may be used to provide additional current sources, to avoid exceeding a maximum desired current through any single electrical path. The additional conductive sources may also be used to provide power at multiple voltages.

As best shown in FIG. 3, axle 130 has an extended tube or conduit 140 that extends into a cool liquid reservoir or vessel 497. Vessel 497 may be formed adjacent to platform 150 and disposed directly beneath the platform for housing the cool liquid. The tube 140 can take in the cool liquid, circulate the liquid among the radar array assembly to cool the assembly, and return heated liquid to the reservoir 497. Alternatively, a separate return path may be provided by allowing the fluid to drain from a rear portion 499 of the array assembly into a fluid return 498. One of ordinary skill can readily configure the liquid intake, circulation, and exhaust components interior to the axle 130 and tube 140, and the array 112. This configuration is advantageous because it provides cooling without running direct pipes through the platform to the array 112. No rotary fluid joints are needed. By centrally locating the reservoir 497, the tube 140 can access the reservoir at all azimuth angles.

More specifically, as shown in FIGS. 3 and 4, cooled fluid is pumped via cooling unit 131 into cool fluid reservoir or vessel 497 via outlet conduit 146. The cooled fluid is supplied to non rotary jointed conduit 140 having a first end **140*a* immersed in the cooling fluid of vessel 497 and a second end 140*b* coupled to the antenna array for providing a fluid path to the array. The fluid path is carried by axle 130**.

In an aspect of the invention, the conduit is disposed within the interior of the axle for transporting the fluid up to the array. Alternatively, it is contemplated that the conduit 140 may be disposed about an exterior of the axle along an outer surface thereof and may be secured thereto for transport to the array.

A pump or heat exchanger 510 (see FIG. 4) for drawing the fluid through conduit 140 the length of the axle and dispersing the cooling fluid to the electronic components 520 (including the transmit/receive modules, for example) may be disposed within the housing of the array as shown in FIG. 4. Once circulated, the now heated fluid may be exhausted from the array via fluid return path 530. In the embodiment shown in FIG. 4 fluid return path 530 comprises an aperture through which the fluid is gravity fed to drain from the array housing into vessel 498 (see FIG. 3). The array may include a splash guard 540 disposed a predetermined distance D from the exhaust outlet of the array and adapted to re-direct portions of the exhausted fluid incident on the guard to vessel 498, thereby ensuring more efficient fluid recovery and use. As shown in FIG. 3, vessel 498 is separated from the outlet of the antenna array by an air gap. Alternatively, a conduit or tube (not shown) may be provided extending from the array to vessel 498 defining the return path for the heated fluid. The circulated or heated fluid received in vessel 498 is then taken via heated fluid intake conduit 146 to heat exchanger/cooling unit 131 for cooling and delivery to vessel 497. In the exemplary embodiment shown in the figures, cooling unit 131 is stationary relative to the rotating array and/or platform. Similarly, vessels 497 and 498 are also stationary relative to the rotating array and/or platform. The vessels are configured in a concentric configuration such that the cooled fluid vessel 497 is formed in a circular, elliptical, oval, annular, rectangular or other geometrical configuration to enable unfettered movement of the conduit 140 within the vessel during rotation/revolution of the array about the platform during operation. Vessel 498 is configured in an annular ring about vessel 497 and vertically aligned with the heated liquid outlet from the array for receiving the fluid return throughout 360 degree rotation of the array about the platform.

Figure 5:
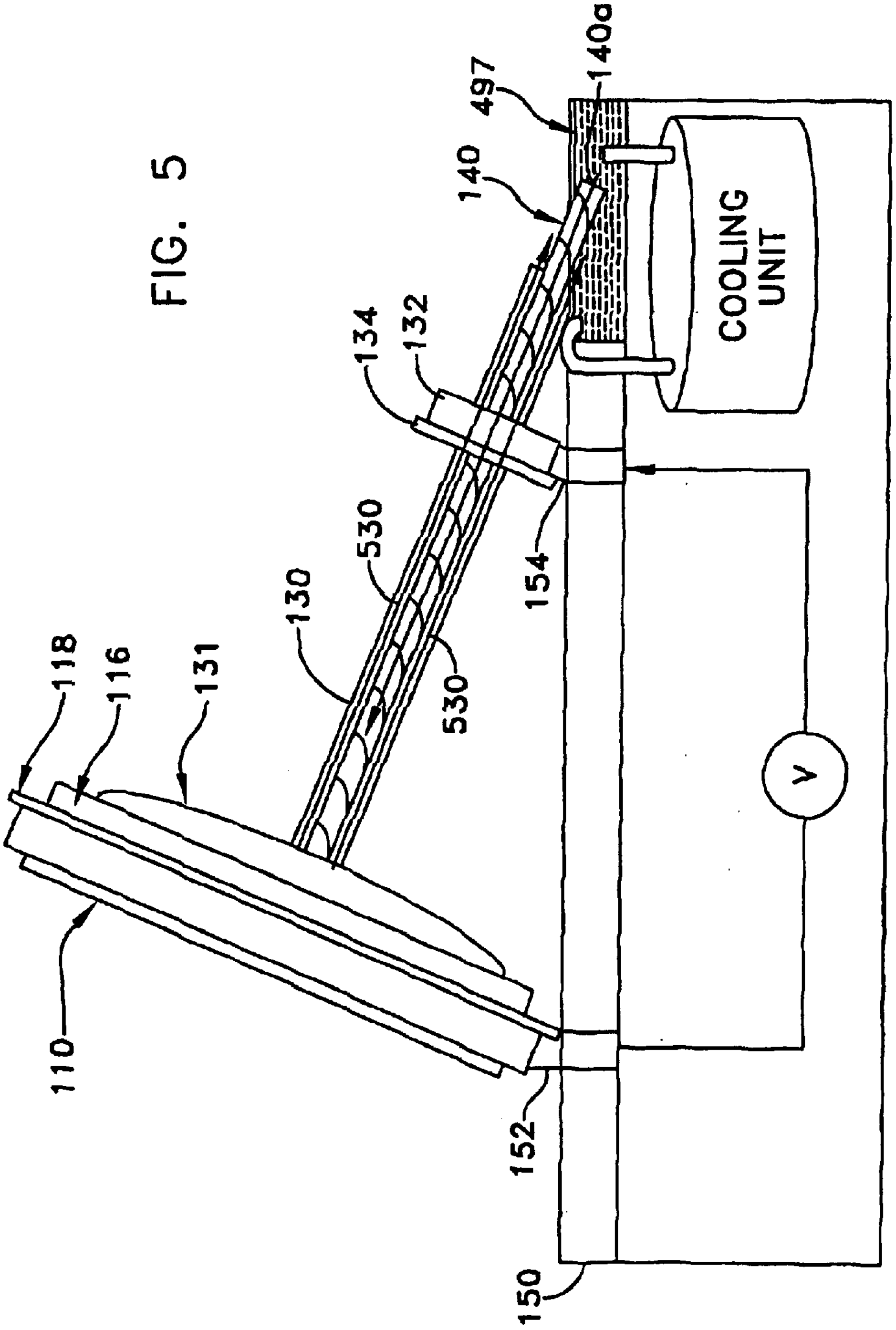
FIG. 5 is a side elevation view of an alternative embodiment of FIG. 2.
Figure 6:
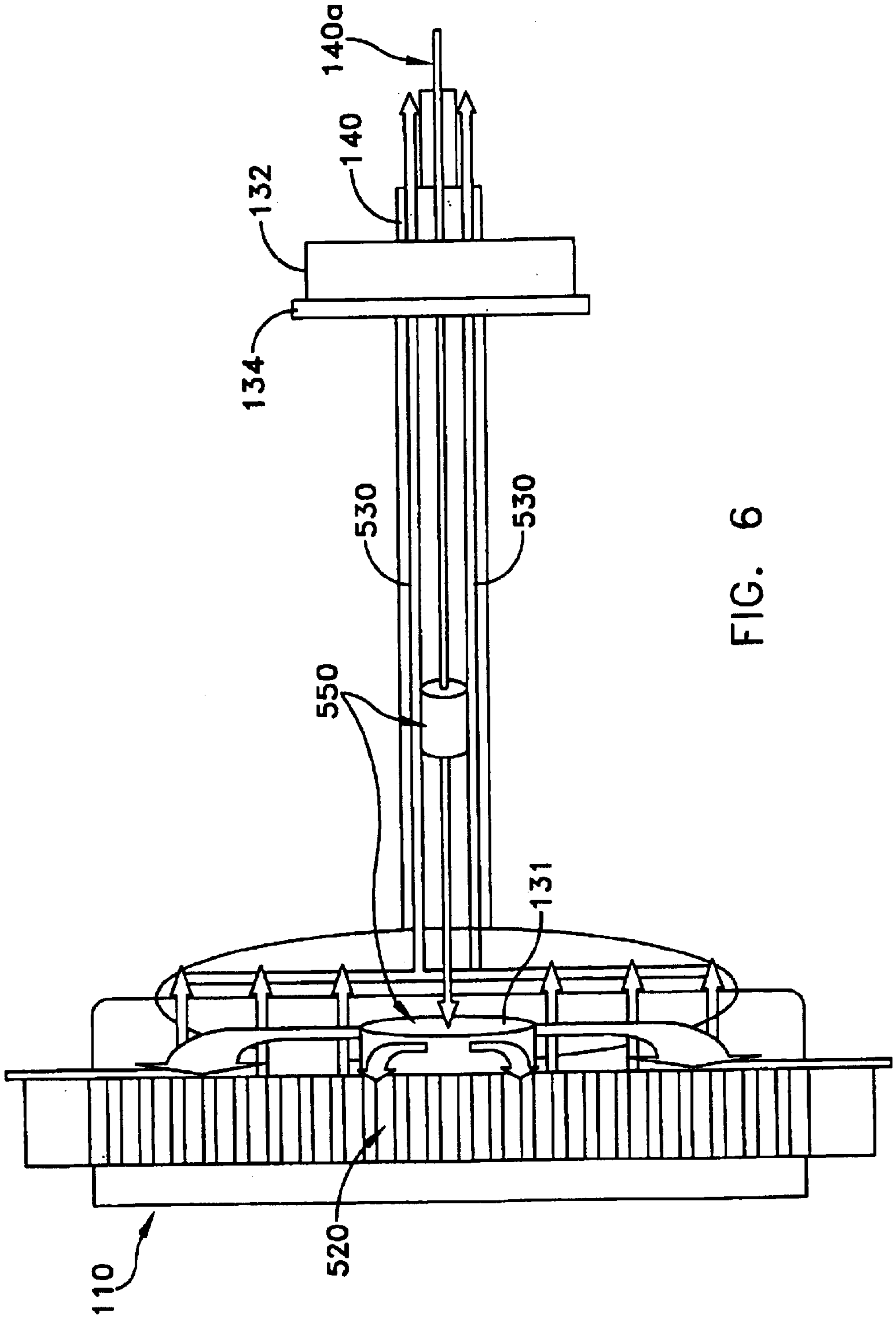
FIG. 6 is a more detailed view of the assembly shown in FIG. 5.

In accordance with another aspect of the invention, FIGS. 5 and 6 show the fluid return path 530 may be carried by axle 130, thereby providing bi-directional fluid flow within or along the axle to/from the array from/to fluid reservoir 497. In this manner, the heated and cooled vessels illustrated in FIGS. 2–4 may be combined into a single vessel, thus eliminating the need for multiple reservoirs. The splash guard may also be eliminated in this configuration. The fluid reservoir 497 receives circulated or heated fluid returned from the array via a return path disposed, for example, within the interior of the axle as shown in FIG. 5 or about an exterior thereof. A non-rotary joint conduit may form the return path 530 from the array for depositing the fluid back into the reservoir 497. The fluid reservoir also provides via non rotary joint conduit 140, cooled fluid to the array. A cooling unit 131 coupled to the reservoir operates to cool the fluid contained in the reservoir for re-circulation to the array. As shown in FIG. 6, one or more pumps 550 may be disposed within or about axle 130 and the array housing for drawing the fluid up through conduit 140 to the array, as well as exhausting the fluid from the array back to the reservoir. Further, a cooling mechanism 131 such as a heat exchanger may be contained within the array housing for cooling the circulated fluid to provide cooled fluid via return path 530. This may eliminate the need for a cooling unit disposed beneath the platform.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A thermal control system comprising:

a rotatable platform having an inlet port for receiving a cooling fluid;

a reservoir for housing said cooling fluid for transport to said rotatable platform; and a non rotary jointed conduit having a first end immersed in said cooling fluid of said reservoir for providing a fluid path for said cooling fluid to said rotatable platform, said reservoir aligned with said platform whereby said non rotary jointed conduit moves through said fluid during operation of said rotatable platform.

2. The system of claim 1, further comprising a cooling unit coupled to said reservoir for providing cooling fluid thereto.

3. The system of claim 2, wherein said cooling unit comprises a heat exchanger fluidly coupled to said reservoir.

4. The system of claim 1, further comprising:

a second reservoir for receiving heated fluid; and at least one cooling unit coupled to said first and second reservoirs and operative for receiving the heated fluid from the second reservoir and providing cooling fluid to said first reservoir.

5. The system of claim 4, wherein said at least one cooling unit comprises a plurality of heat exchangers.

6. The system of claim 1, wherein said non rotary jointed conduit comprises a tube.

7. The system of claim 1, wherein said non rotary jointed conduit comprises a flexible material.

8. The system of claim 1, wherein said non rotary jointed conduit comprises a rigid material.

9. The system of claim 1, wherein the reservoir is stationary relative to a fixed position.

10. The system of claim 1, wherein the reservoir rotates with the rotatable platform.

11. The system of claim 2, wherein said cooling unit is stationary relative to the reservoir.

12. The system of claim 4, wherein the first and second reservoirs are concentric.

13. The system of claim 4, wherein the first and second reservoirs are disposed below the rotatable platform to thereby enable a gravity feed of the heated fluid from the outlet port to the second reservoir.

14. A method for cooling a rotatable platform having an inlet port for receiving a cooling fluid, said method comprising:

providing a reservoir for housing cooling fluid;

aligning said reservoir with said inlet port of said platform; and providing said cooling fluid housed in said reservoir via a non rotary jointed conduit into said inlet port of said rotatable platform, whereby said non rotary jointed conduit moves through said fluid during operation of said rotatable platform.

15. The method of claim 14, wherein the step of providing said cooling fluid housed in said reservoir via a non rotary jointed conduit further comprises pumping said cooling fluid through said non rotary jointed conduit.

16. A thermal control system for exchanging fluids between a rotatable platform and a reservoir, said system comprising:

a rotatable platform having an inlet port for receiving a cooled fluid and an outlet port for providing a heated fluid;

a reservoir comprising a first vessel for receiving the heated fluid from the outlet port of the rotatable platform, and a second vessel for housing cooled fluid for transport to the inlet port of the rotatable platform via a non rotary jointed conduit, said conduit having an end immersed in said cooled fluid in said second vessel; and a heat exchanger coupled to the first and second vessels, said heat exchanger operative for receiving the heated fluid from the first vessel, and for providing cooled fluid to the second vessel for transport via said non rotary jointed conduit to the rotatable platform.

17. The system of claim 16, further comprising a second non rotary jointed conduit having a first end coupled to the output port of the rotatable platform for providing a fluid path for said heated fluid to said first vessel.

18. The system of claim 16, wherein the reservoir is stationary relative to a fixed position.

19. The system of claim 16, wherein the reservoir rotates with the rotatable platform.

20. The system of claim 16, further comprising a plurality of heat exchangers fluidly coupled to the first and second vessels.

21. The system of claim 16, wherein said heat exchanger is stationary relative to the reservoir.

22. The system of claim 16, wherein the first vessel is circular, oval or elliptical shaped, and said second vessel is annular shaped.

23. The system of claim 16, wherein the reservoir is disposed below the rotatable platform to thereby enable a gravity feed of the heated fluid from the outlet port to the first vessel.

24. The system of claim 16, wherein the reservoir is disposed below the rotatable platform such that the outlet port is vertically aligned with the first vessel.

25. The system of claim 16, wherein the heat exchanger includes a pump for pumping the cooled fluid through the second vessel of the reservoir to the platform.

26. An antenna system comprising:

an antenna array mounted on a first wheel, the first wheel having a circumferential portion adapted to engage at least one path disposed on a platform for revolving the radar array about the platform;

an axle coupled to the first wheel; and a thermal control system for providing cooling fluid to the antenna array, said thermal control system comprising:

a first vessel for housing said cooling fluid for transport to said antenna array; and a non rotary jointed conduit having a first end immersed in said cooling fluid of said first vessel and a second end coupled to said antenna array for providing a fluid path to said array for said cooling fluid.

27. The system of claim 26, wherein said fluid path is carried by said axle.

28. The system of claim 27, wherein said fluid path is formed within an interior of said axle.

29. The system of claim 26, wherein said antenna array comprises an outlet for exhausting said fluid transported to said array via said fluid path.

30. The system of claim 26, further comprising a guard disposed a predetermined distance from said outlet and adapted to re-direct portions of the exhausted fluid incident on said guard to a second vessel.

31. The system of claim 30, wherein the second vessel is separated from the outlet of the antenna array by an air gap.

32. The system of claim 27, wherein said antenna array comprises an outlet for exhausting said fluid transported to said array, and wherein a second fluid path extending from said outlet is carried by said axle for returning said exhausted fluid from said antenna array to said first vessel.

33. The system of claim 26, further comprising a heat exchanger coupled to said first and second vessels for receiving the exhausted fluid from the second vessel and providing cooling fluid to said first vessel.

34. An antenna system comprising:

an antenna array mounted on a first wheel, the first wheel having a circumferential portion adapted to engage at least one path disposed on a platform for revolving the radar array about the platform;

an axle coupled to the first wheel; and a first vessel for housing cooling fluid for transport to said antenna array;

a non rotary jointed conduit having a first end immersed in said cooling fluid of said first vessel and a second end coupled to said antenna array, said conduit carried by said axle for providing a fluid path to said array for circulating the cooling fluid, and a return fluid path carried by said axle for transporting the circulated fluid from the array to the first vessel.

35. The system of claim 34, further comprising a cooling unit coupled to the first vessel for cooling the fluid for transport to the array.

36. A method for cooling a radar antenna system comprising an antenna array mounted on a first wheel, the first wheel having a circumferential portion adapted to engage at least one path disposed on a platform for revolving the radar array about the platform, and an axle coupled to the first wheel, said method comprising:

providing a vessel for housing cooling fluid; and providing said cooling fluid housed in said vessel via a non rotary jointed conduit carried by said axle to said array.

* * * * *